United States Patent
Lee et al.

(10) Patent No.: US 12,424,607 B2
(45) Date of Patent: Sep. 23, 2025

(54) ELECTRODE COATING APPARATUS, AND ELECTRODE MANUFACTURING METHOD USING SAME

(71) Applicant: LG ENERGY SOLUTION, LTD., Seoul (KR)

(72) Inventors: Su Min Lee, Daejeon (KR); Sang Seung Oh, Daejeon (KR); Kyu Tae Park, Daejeon (KR); Su Ji Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/266,724

(22) PCT Filed: Sep. 1, 2022

(86) PCT No.: PCT/KR2022/013097
§ 371 (c)(1),
(2) Date: Jun. 12, 2023

(87) PCT Pub. No.: WO2023/048419
PCT Pub. Date: Mar. 30, 2023

(65) Prior Publication Data
US 2024/0047636 A1  Feb. 8, 2024

(30) Foreign Application Priority Data
Sep. 27, 2021 (KR) .......... 10-2021-0127327

(51) Int. Cl.
*B05C 5/00* (2006.01)
*B05C 9/12* (2006.01)
(Continued)

(52) U.S. Cl.
CPC ............. *H01M 4/0404* (2013.01); *B05C 9/12* (2013.01); *H01M 4/04* (2013.01); *H01M 4/0402* (2013.01);
(Continued)

(58) Field of Classification Search
None
See application file for complete search history.

(56) References Cited

U.S. PATENT DOCUMENTS 4,086,872 A * 5/1978 Pan .......... B05D 1/24
118/638
4,513,683 A * 4/1985 Kisler .......... B05C 11/023
118/620

(Continued)

FOREIGN PATENT DOCUMENTS

| CN | 112635703 A | 4/2021 |
|---|---|---|
| JP | 2005-100909 A | 4/2005 |

(Continued)

OTHER PUBLICATIONS

International Search Report (PCT/ISA/210) issued in PCT/KR2022/013097 mailed on Dec. 2, 2022.
(Continued)

*Primary Examiner* — Binu Thomas
(74) *Attorney, Agent, or Firm* — Birch, Stewart, Kolasch & Birch, LLP (57) ABSTRACT

An electrode drying apparatus and a method of manufacturing an electrode using the same is provided. In the electrode drying apparatus, by inducing static electricity onto a back side of an electrode current collector of which a front surface is coated with an electrode slurry so that the electrode slurry has an electric charge opposite to an electric charge of an ionic binder contained in the electrode slurry as a binder, even when solvent volatilization occurs during a (Continued)

drying process of the electrode slurry, it is possible to prevent binders from being moved to a surface of the electrode slurry, and thus it is possible to improve an adhesive force between an electrode mixture layer formed by drying the electrode slurry and the electrode current collector.

5 Claims, 2 Drawing Sheets

(51) Int. Cl.
*H01M 4/04* (2006.01)
*H01M 4/62* (2006.01)
*B05C 9/14* (2006.01)

(52) U.S. Cl.
CPC ......... *H01M 4/0471* (2013.01); *H01M 4/622* (2013.01); *B05C 5/00* (2013.01); *B05C 9/14* (2013.01); *B05D 2252/02* (2013.01)

(56) References Cited

U.S. PATENT DOCUMENTS

| | | | |
|---|---|---|---|
| 2009/0324842 A1* | 12/2009 | Tanaka | B05C 5/0254 |
| | | | 118/621 |
| 2010/0092866 A1 | 4/2010 | Kim | |
| 2012/0237825 A1* | 9/2012 | Nakano | H01M 4/0404 |
| | | | 118/620 |
| 2013/0327249 A1 | 12/2013 | Winter et al. | |
| 2020/0295353 A1 | 9/2020 | Tanaka | |
| 2021/0151738 A1* | 5/2021 | Moon | H01M 4/04 |

FOREIGN PATENT DOCUMENTS

| | | | | |
|---|---|---|---|---|
| JP | 2005-100909 | * | 9/2005 | |
| JP | WO2011/061818 A1 | | 4/2013 | |
| JP | 2014-7037 A | | 1/2014 | |
| JP | 2014-503967 A | | 2/2014 | |
| JP | 5418860 B2 | | 2/2014 | |
| JP | 2016-100094 A | | 5/2016 | |
| JP | 2020-149862 A | | 9/2020 | |
| KR | 10-2008-0042967 A | | 5/2008 | |
| KR | 10-2010-0042180 A | | 4/2010 | |
| KR | 10-2015-0014629 A | | 2/2015 | |
| KR | 10-2017-0012930 A | | 2/2017 | |
| KR | 10-2017-0101023 A | | 9/2017 | |
| KR | 10-2018-0036631 A | | 4/2018 | |
| KR | 10-2020-0015187 A | | 2/2020 | |
| KR | 10-2020-0042643 A | | 4/2020 | |
| WO | WO 2010/087440 A1 | | 6/2010 | |
| WO | WO-2017146292 A1 | * | 8/2017 | ............ B03C 3/30 |
| WO | WO-2020080710 A1 | * | 4/2020 | ............ B05C 9/12 |

OTHER PUBLICATIONS

Extended European Search Report for European Application No. 22873124.6, dated Jun. 26, 2024.
Japanese Office Action for Japanese Application No. 2023-536177, dated Jun. 3, 2024, with an English translation.
Korean Office Action for Korean Application No. 10-2021-0127327, dated Jul. 18, 2025, with English translation.

* cited by examiner

ELECTRODE COATING APPARATUS, AND ELECTRODE MANUFACTURING METHOD USING SAME

TECHNICAL FIELD

The present invention relates to an apparatus for coating an electrode current collector with an electrode slurry, and a method of manufacturing an electrode using the same.

This application claims the benefit of priority based on Korean Patent Application No. filed on Sep. 27, 2021, and the entire contents of the Korean patent application are incorporated herein by reference.

BACKGROUND ART

An active material and a binder resin component are mixed and dispersed in a solvent to make a slurry, and a surface of a current collector is coated with the slurry and dried to form a mixture layer so as to manufacture an electrode of a lithium secondary battery.

Since a high-capacity active material is used in order to achieve a higher energy density of such a lithium secondary battery, as the loading of the active material loaded on an electrode increases, an adhesive force between the active material and the electrode decreases, or due to an increase in resistance according to a change in contact interface between negative electrode active materials, the capacity rapidly decreases as the charge/discharge cycle progresses, and thus a cycle lifetime is shortened.

In general, polymer binders are widely used as binders, and by increasing an amount of the polymer binders, it is possible to increase a binding strength between an active material and a current collector as well as between the active materials, reduce the detachment of the active material from the current collector, and increase an effect of suppressing volume expansion due to charging and discharging of the battery. However, when an excessive amount of the polymer binders is used, problems such as an increase in electrical resistance of a negative electrode due to electrical insulation of the binders, a decrease in capacity due to a relative decrease in an amount of the active material, and the like have emerged.

Further, as a solvent contained in a slurry is volatilized during a drying process, a phenomenon is induced in which the binders, which were uniformly dispersed inside the slurry, move to a surface of the slurry and is concentrated. Therefore, there is a problem in that, due to the above phenomenon, it is difficult to induce a uniform chemical reaction in the electrode, the tendency of the binders to agglomerate separately increases as the length of the binder increases, and the chronological property is also affected.

Therefore, development of a technique, in which, with a strong adhesive force even with a small amount, separation between electrode active materials or between an electrode active material and a current collector is prevented when an electrode is manufactured, and the volume expansion of the electrode active material generated during repeated charging and discharging is controlled with strong physical properties to promote the structural stability of the electrode and the performance improvement of the battery, is required.

Patent Document

Korean Patent Application Publication No. 10-2015-0014629

DISCLOSURE

Technical Problem

An object of the present invention is to provide a method of preventing a phenomenon in which binders contained in a slurry move to a surface of the slurry and are concentrated even in a drying process of an electrode slurry so as to improve an adhesive force between an electrode mixture layer and an electrode current collector.

Technical Solution

The present invention is directed to solving the above-described problem and is providing an electrode coating apparatus including a transfer unit configured to move an electrode current collector in a roll-to-roll manner; a coater configured to discharge an electrode slurry on a first surface of the electrode current collector being moved by the transfer unit; and an electrostatic inducer configured to induce static electricity on a second surface of the electrode current collector opposite the first surface coated with the electrode slurry.

Here, the electrostatic inducer may induce static electricity by contact charging by coming into contact with the second surface of the electrode current collector and an electrostatic induction material, or may induce static electricity using an electric charge formed by triboelectric charging of a friction member.

As an example, the electrostatic inducer may include a roller including a charging region having a surface coated with an electrostatic induction material, and static electricity may be induced by contact between the electrostatic induction material of the roller and the electrode current collector.

In this case, the electrostatic induction material may include at least one of ebonite, glass, nylon, wool, rayon, silk, paper, iron, rubber, copper, silver, gold, platinum, polystyrene, acrylic, celluloid, polyvinylchloride, polypropylene, polyethylene, silicone, or TEFLON.

As another example, the electrostatic inducer may include a motor having a motor shaft; a power transmission shaft coupled to the motor shaft, the power transmission shaft having a gear formed on an outer circumferential surface thereof; a static electricity generator including a circular rotary friction member having a gear formed on an outer circumferential surface thereof, the circular rotatory friction member being configured to be rotated by rotation of the power transmission shaft, a fixed friction member located at one side of an outer circumferential surface of the rotary friction member, to be in contact with the outer circumferential surface of the rotary friction member, an arc-shaped electrostatic induction member spaced a predetermined distance from the rotary friction member, the arc shaped electrostatic induction member being located at a position symmetrical to that of the fixed friction member with respect to the rotary friction member, and an electrostatic induction wire located at one side of the electrostatic induction member; and a static electricity plate connected to the electrostatic induction member by the electrostatic induction wire, the static electricity plate being configured to have an electric charge on a surface thereof, and the static electricity plate facing the second surface of the electrode current collector, wherein static electricity may be induced by bringing the electric charge induced by the rotary friction member to be close to the second surface of the electrode current collector.

In this case, the gear of the circular rotary friction member may be located above or below the outer circumferential surface of the rotary friction member and the fixed friction member is in surface contact with the outer circumferential surface of the rotary friction member.

Meanwhile, the electrode slurry applied on the first surface of the electrode current collector may contain an ionic binder, and the electrostatic inducer may be configured to induce an electric charge opposite to an electric charge of the ionic binder of the electrode slurry applied on the first surface of the electrode current collector on the second surface of the electrode current collector.

In this case, the ionic binder may include at least one polymer selected from carboxymethyl cellulose (CMC), hydroxypropyl cellulose, regenerated cellulose, polyacrylic acid (PAA), polyacrylonitrile (PAN), polyacrylamide (PAM), styrene-butadiene rubber (SBR), acrylonitrile-butadiene rubber, acrylic rubber, butyl rubber, fluoro rubber, polyvinyl alcohol (PVA), polyethylene glycol (PEG), or alginate.

Further, the transfer unit may be operated at a speed of 20 to 100 m/min.

The present invention is also directed to providing a method of manufacturing an electrode, including applying an electrode slurry on first surface of an electrode current collector; and inducing static electricity on a second surface of the electrode current collector opposite the first surface coated with the electrode slurry.

In this case, the electrode slurry may contain an ionic binder, and the static electricity induced on the second surface of the electrode current collector may have an electric charge opposite to an ionic charge of the ionic binder.

Further, the ionic binder may include at least one polymer selected from CMC, hydroxypropyl cellulose, regenerated cellulose, PAA, PAN, PAM, SBR, acrylonitrile-butadiene rubber, acrylic rubber, butyl rubber, fluoro rubber, PVA, PEG, or alginate.

In addition, the inducing of the static electricity on the second surface of the electrode current collector may be performed by contact charging between the second surface of the electrode current collector and an electrostatic induction material or may be performed by triboelectric charging of a friction member.

Further, the method may further include, after the inducing of the static electricity, drying the electrode slurry applied on the first surface of the electrode current collector.

In this case, the drying of the electrode slurry may be performed at a temperature of 50° C. to 200° C.

Advantageous Effects

According to an electrode coating apparatus according to the present invention, by inducing static electricity onto a back side of an electrode current collector of which a front surface is coated with an electrode slurry so that the electrode slurry has an electric charge opposite to an electric charge of an ionic binder contained in the electrode slurry as a binder, even when solvent volatilization occurs during a drying process of the electrode slurry, it is possible to prevent the binder from being moved to a surface of the electrode slurry, and thus it is possible to improve an adhesive force between an electrode mixture layer formed by drying the electrode slurry and the electrode current collector.

DETAILED DESCRIPTION OF THE PREFERRED EMBODIMENTS

While the present invention may have various modifications and alternative forms, specific embodiments thereof will be described in detail.

However, it should be understood that there is no intent to limit the present invention to the particular forms disclosed, and on the contrary, the present invention is to cover all modifications, equivalents, and alternatives falling within the spirit and scope of the present invention.

It should be further understood that the terms "comprise," "comprising," "include," and/or "including," when used herein, specify the presence of stated features, integers, steps, operations, components, parts, or combinations thereof, but do not preclude the presence or addition of one or more other features, integers, steps, operations, components, parts, or combinations thereof.

In addition, when a layer, film, region, or plate is referred to as being "formed on" another layer, film, region, or plate, it includes a case in which the layer, film, region, or plate is formed directly on another layer, film, region, or plate and a case in which still another layer, film, region, or plate is interposed between the layer, film, region, or plate and another layer, film, region, or plate. In contrast, when a layer, film, region, or plate is referred to as being "formed below" another layer, film, region, or plate, it includes a case in which the layer, film, region, or plate is formed directly below another layer, film, region, or plate and a case in which still another layer, film, region, or plate is interposed between the layer, film, region, or plate and another layer, film, region, or plate. Further, in this specification, when a component is referred to as being disposed "on" another component, it includes a case in which a component is disposed above another component and a case in which a component is disposed below another component.

Hereinafter, the present invention will be described in more detail.

Coating Apparatus for Manufacturing Electrode

In an embodiment, the present invention provides a coating apparatus for manufacturing an electrode including a transfer unit that moves an electrode current collector in a traveling direction through a roll-to-roll supply process, a coater disposed on a transfer unit to discharge an electrode slurry onto a surface of the electrode current collector being moved by the transfer unit, and an electrostatic inducer disposed under the transfer unit to induce static electricity on a back surface of the electrode current collector of which a surface is coated with the electrode slurry by the coater.

Figure 1:
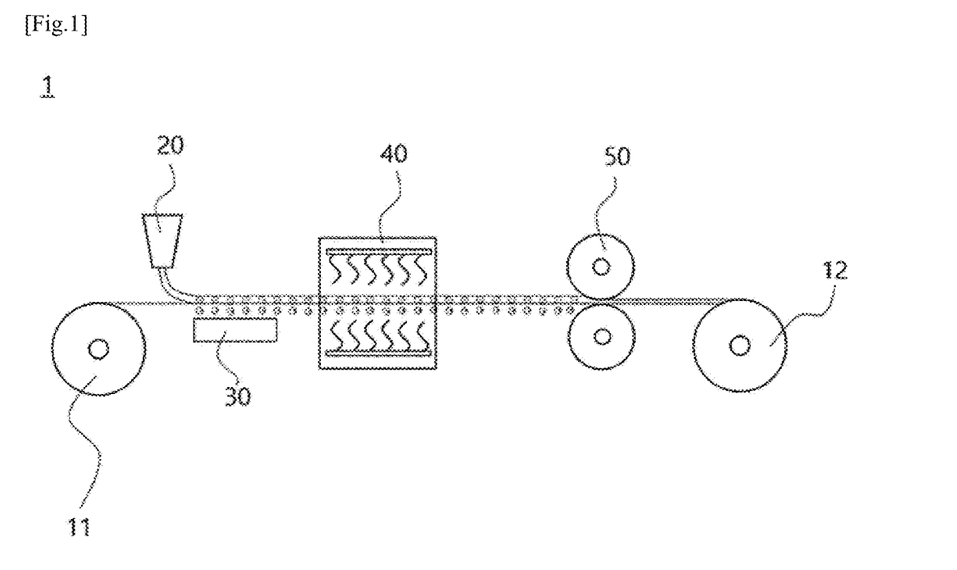
FIG. 1 is a structural diagram schematically illustrating a structure of an electrode coating apparatus according to the present invention.

As illustrated in FIG. 1, the coating apparatus for manufacturing an electrode according to the present invention includes transfer units 11 and 12 that move an electrode current collector, a coater 20 that supplies an electrode slurry onto a surface of the electrode current collector, and an electrostatic inducer 30 that induces static electricity on a back surface of the electrode current collector coated with the electrode slurry.

In this case, the transfer units 11 and 12 may move an electrode assembly in a manner commonly applied in the art, and specifically, may include a pair of rollers disposed in front and the rear of the electrode current collector in the traveling direction using a roll-to-roll manner.

Further, the transfer units 11 and 12 may be operated at a speed at which the electrode slurry can be uniformly applied on a surface of the electrode assembly, specifically, may be operated at a speed of 20 to 100 m/min, and more specifically, may be operated at a speed of 30 to 90 m/min, 40 to 90 m/min, 50 to 100 m/min, 70 to 100 m/min, 20 to 80 m/min, 20 to 60 m/min, 20 to 40 m/min, 40 to 80 m/min, or 25 to 70 m/min. According to the present invention, by controlling the operating speed of the transfer units 11 and 12 as described above, it is possible to apply the electrode slurry on the surface of the electrode assembly with a constant thickness, and it is possible to provide a time required for the electrostatic inducer to induce static electricity on the back surface of the electrode current collector coated with the electrode slurry.

In addition, the coater 20 is a unit for supplying an electrode slurry onto a surface of a moving electrode current collector, may be applied in a manner commonly applied in the art, and specifically may include a slot die coater.

The slot die coater applies an electrode slurry on an electrode current collector to form an electrode mixture layer and may have a structure in which the electrode slurry is discharged through a pair of outlets formed in upper and lower dies, thereby forming a two-layer electrode mixture layer on the electrode current collector.

In addition, the electrostatic inducer 30 is positioned under the electrode current collector being moved by the transfer unit, the electrode slurry is discharged by the coater 20, and the electrostatic inducer 30 induces static electricity on the back surface of the electrode current collector of which the surface is coated with the discharged electrode slurry.

Here, the electrode slurry applied on the surface of the electrode current collector may contain an ionic binder having an electric charge, and the electrostatic inducer 30 may induce the static electricity so that the back surface of the electrode current collector of which the surface is coated with the electrode slurry is charged with an electric charge opposite to the electric charge of the ionic binder.

That is, when an electrode slurry containing an ionic binder having a (+) electric charge is applied on an electrode current collector, the electrostatic induction device may induce a (−) electric charge on a back surface of the electrode current collector coated with the electrode slurry, or when an electrode slurry containing an ionic binder having a (−) electric charge is applied to the electrode current collector, the electrostatic induction device may induce a (+) electric charge on the back surface of the electrode current collector coated with the electrode slurry.

The type of the ionic binder is not particularly limited as long as the ionic binder has an electric charge, and examples of the ionic binder may include one or more polymers selected from the group consisting of hydroxypropyl cellulose, regenerated cellulose, polyacrylic acid (PAA), polyacrylonitrile (PAN), polyacrylamide (PAM), styrene-butadiene rubber (SBR), acrylonitrile-butadiene rubber, acrylic rubber, butyl rubber, fluoro rubber, polyvinyl alcohol (PVA), polyethylene glycol (PEG), and alginate in consideration of a bonding force with the electrode active materials and the electrical properties inside the mixture layer. The polymers may include a carboxyl group (—COOH) or a sulfone group (—SOOOH), and a part of the polymers may have a (−) electric charge due to having the form of a salt with an alkali metal ion such as $Na^+$, $Li^+$, or the like.

Further, the electrostatic inducer 30 may induce static electricity without limitation in its form or driving method as long as it can induce static electricity by charging the surface of the electrode current collector, and specifically, the electrostatic inducer 30 may have a structure of inducing contact charging by directly rubbing with the moving electrode current collector, or a structure of inducing triboelectric charging by providing an additional friction member.

A material is composed of atomic nuclei and electrons, and the number of electrons should be equal to the number of nuclei to maintain neutrality. However, since electrons (particularly, electrons furthest from the nucleus) move relatively freely, when two materials come into contact with each other, one material gains electrons and becomes negatively charged, and the other loses electrons and becomes positively charged. In this case, as a contact pressure and an electron separation rate (contact speed) increase, the quality of electric charges increases.

Examples of a charging method for imparting an electric charge to a surface of the material using the above phenomena include contact charging, triboelectric charging, separation charging, and the like. Among them, the "contact charging" occurs when two different objects come into contact with each other and are separated. When different objects come into contact with each other, electric charge transfer occurs in each object to form an electric double layer, and static electricity is generated by electric charge separation. Further, even in the same type of objects, contact charging may occur depending on surface conditions such as corrosion, smoothness, and the like, and one of the above charging methods is "triboelectric charging." The "triboelectric charging" refers to a phenomenon in which static electricity is generated when an object causes friction or when a contact point moves and an electric charge are separated by friction.

The electrostatic inducer 30 of the present invention may apply an electric charge to the surface of the moving electrode current collector using contact charging and triboelectric charging.

Figure 2:
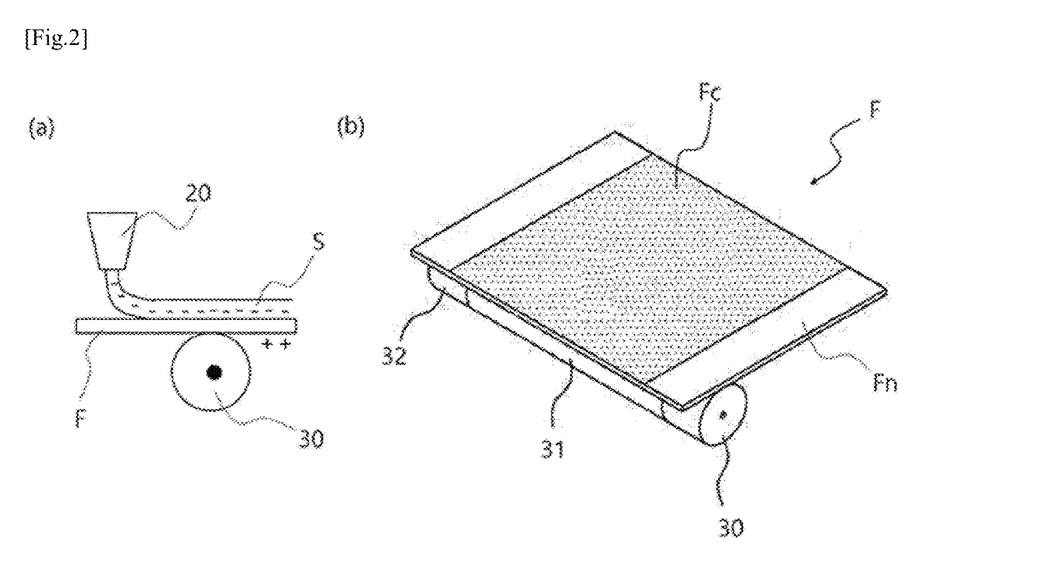
FIG. 2 shows views illustrating an example of an electrostatic inducer according to the present invention.

As an example, as illustrated in FIG. 2, the electrostatic inducer may include a roller 30 that comes into contact with a back surface of an electrode current collector F of which a surface is coated with an electrode slurry S by applying contact charging, and the roller 30 may coat the surface of the electrode current collector F with an electrostatic induction material so that the electrostatic induction material comes into direct contact with a region coated with the electrode slurry S, that is, a back surface of a coating part Fc of the back surface of the electrode current collector F.

The roller 30 may include a charging region 31 coated with the electrostatic induction material on the back surface of the coating part Fc coated with the electrode slurry S to directly induce the electric charge on the back surface of the coating part Fc while the electrode current collector F moves. Examples of the electrostatic induction material that can be used in this case may include ebonite, glass, nylon, wool, rayon, silk, paper, iron, rubber, copper, silver, gold, platinum, polystyrene, acrylic, celluloid, polyvinylchloride, polypropylene, polyethylene, silicone, TEFLON, and the like.

For example, the electrostatic induction material may include TEFLON, polyvinyl chloride, celluloid, or rubber.

In addition, since the back surface of the coating part Fc coated with the electrode slurry is coated with the electrostatic induction material, the entire surface of the roller 30 may be coated or only a central part of the roller may be coated. When the central part of the roller 30 is coated with the electrostatic induction material, the roller 30 may include a non-charging region 32 having both ends not coated with the electrostatic induction material, and in this case, a total area of the non-charging region 32 not coated with the electrostatic induction material may be 25% or less of the entire surface of the roller 30.

Figure 3:
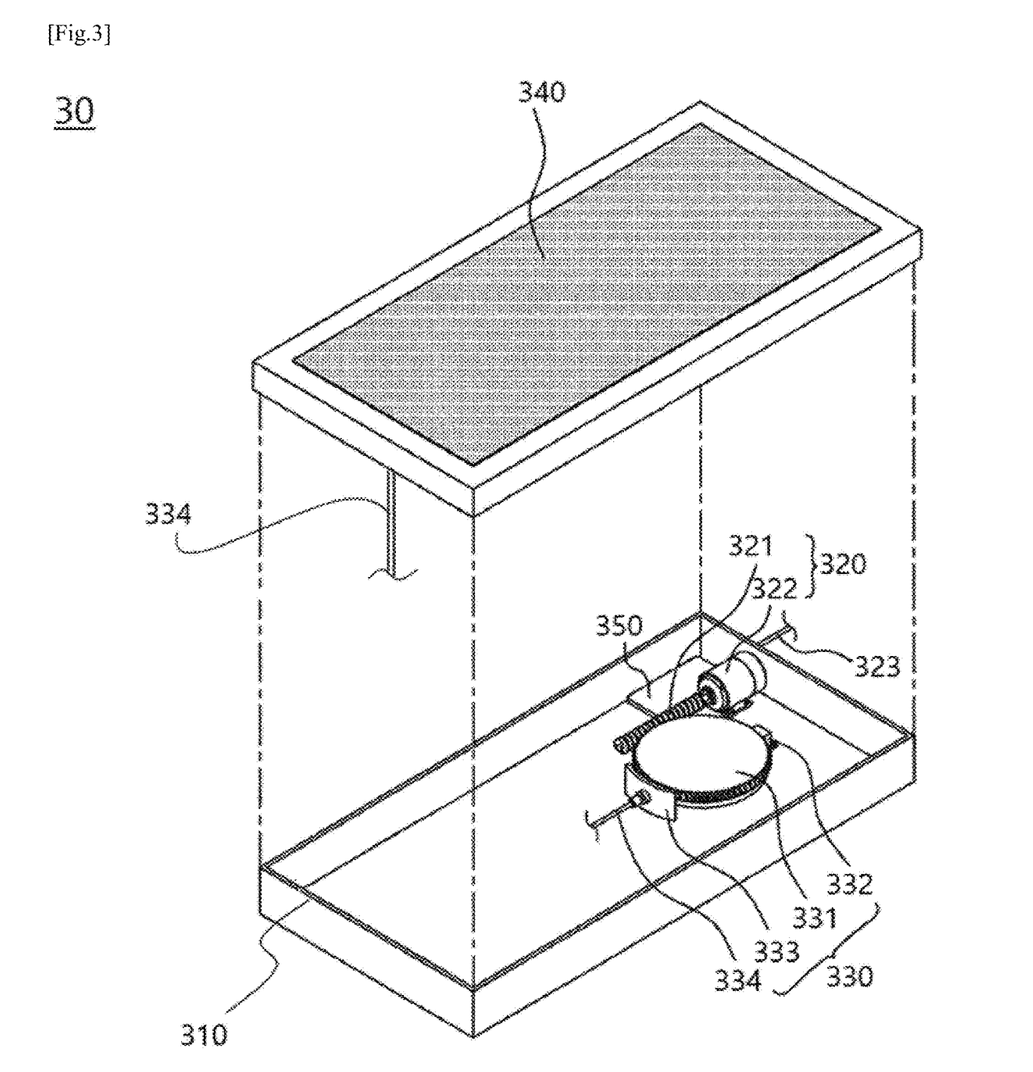
FIG. 3 is a perspective view illustrating another example of the electrostatic inducer according to the present invention.

As another example, the electrostatic inducer 30 may have a configuration including a friction member by applying triboelectric charging. Specifically, as illustrated in FIG. 3, the electrostatic inducer 30 may include a motor unit 320 including a motor 322 and a power transmission shaft 321 shaft-coupled to a motor shaft of the motor and having a gear formed on an outer circumferential surface thereof, a static electricity generator 330 including a circular rotary friction member 331 gear-coupled to the power transmission shaft and having a gear formed on an outer circumferential surface thereof to be rotated by rotation of the power transmission shaft 321, a fixed friction member 332 installed in contact with one side of the outer circumferential surface of the rotary friction member, an arc-shaped electrostatic induction member 333 spaced a predetermined distance from the rotary friction member and installed at a position symmetrical to that of the fixed friction member 332 with respect to the rotary friction member 331, and an electrostatic induction wire 334 installed at one side of the electrostatic induction member 333, and a static electricity plate 340 connected to the electrostatic induction member 333 by the electrostatic induction wire 334, has an electric charge on a surface thereof, and is provided to face the back surface of the electrode current collector.

Here, the motor unit 320 is composed of the motor 322 to which external power 323 is supplied or which is driven by a battery, and the power transmission shaft 321 shaft-coupled to the motor shaft of the motor 322 and having the gear formed on the outer circumferential surface thereof. The gear formed on the outer circumferential surface of the power transmission shaft 321 is formed to be rotated by being engaged with the rotary friction member which will be described below.

Further, the gear formed on the outer circumferential surface of the power transmission shaft 321 is formed to be rotated by being engaged with the rotary friction member 331 which will be described below.

The static electricity generator 330 is composed of the circular rotary friction member 331 gear-coupled to the power transmission shaft 321 and having the gear formed on the outer circumferential surface thereof to be rotated by rotation of the power transmission shaft 321 when the motor 322 rotates, the fixed friction member 332 which is installed in contact with one side of the outer circumferential surface of the rotary friction member 331, the arc-shaped electrostatic induction member 333 spaced a predetermined distance from the rotary friction member and installed at a position symmetrical to that of the fixed friction member 332 with respect to the rotary friction member 331, and the electrostatic induction wire 334 which is installed at one side of the electrostatic induction member 333.

In this case, in order to reduce loss of the generated static electricity, the rotary friction member 331 may have a gear formed on an upper or lower part of the outer circumferential surface, and the fixed friction member 332 may be formed in surface contact with the outer circumferential surface on which the gear is not formed.

Although there is no particular limitation on the materials constituting the rotary friction member 331 and the fixed friction member 332, in order to increase an amount of generated static electricity, materials at high rank in a triboelectric series may be used and materials that can be processed for a desired shape may be used.

Further, the power transmission shaft 321 and the rotary friction member 331 are installed to be gear-engaged with each other in a worm gear method, and when the power transmission shaft 321 rotates, the rotary friction member 331 engaged with the gear of the power transmission shaft 321 rotates, and accordingly, the rotary friction member 331 rubs the fixed friction member 332, and static electricity is generated.

The static electricity generated as described above has the strongest force to offset the static electricity at a position where the static electricity is generated, that is, a position close to the fixed friction member 332. In order to transmit the static electricity generated by the static electricity plate 340 without offsetting the static electricity as much as possible, the electrostatic induction member 333 is installed adjacent to the rotary friction member 331 but farthest from the fixed friction member 332.

In addition, the fixed friction member 332 may be formed and used in various shapes, and although not illustrated in the drawings, an integrated pad may be fixed to a main body case 310 and used. For example, the fixed friction member may have a brush shape.

As the electrostatic induction wire 334, a wire coated with an insulating material may be used so that the static electricity generated by the rotary friction member 331 and the fixed friction member 332 is not lost when being induced to the static electricity plate 340.

In addition, the static electricity plate 340 is connected to the electrostatic induction member 333 and formed to discharge the induced static electricity over a large area, and the static electricity plate 340 is formed in a plate shape as illustrated in the drawings to have a large area and may be disposed to be spaced a predetermined distance from the back surface of the electrode current collector. In this case, the distance may range from 1 to 30 cm and specifically may range from 1 to 20 cm, 1 to 10 cm, 1 to 5 cm, 5 to 10 cm, 10 to 20 cm, or 15 to 30 cm.

The static electricity plate 340 may be disposed to be spaced a predetermined distance from the back surface of the electrode current collector of which the surface is coated with the electrode slurry, and thus may indirectly induce charging on the back surface of the electrode current collector.

Furthermore, the electrostatic inducer 30 may control a rotation speed of the rotary friction member 331 in order to sufficiently induce the static electricity on the back surface of the electrode current collector, and to this end, the electrostatic inducer 30 may further include a separate control unit 350 inside a case.

The electrode coating apparatus according to the present invention has the above-described configuration and thus has an advantage in that the ionic binder of the electrode slurry applied on the surface of the electrode collector can be prevented from increasing a concentration thereof by being moved to the surface due to the influence of the solvent volatilized during the drying process of the electrode.

Method of Manufacturing Electrode

Furthermore, an embodiment of the present invention provides a method of manufacturing an electrode using the electrode coating apparatus.

Specifically, the method of manufacturing an electrode includes applying an electrode slurry onto a surface of an electrode current collector and inducing static electricity on a back surface of the electrode current collector coated with the electrode slurry.

In the method of manufacturing an electrode according to the present invention, the electrode slurry containing ionic binders having an electric charge is applied on the surface of the electrode current collector, and an electric charge opposite to the electric charge of the ionic binder is charged to the back surface of the electrode current collector coated with the electrode slurry to induce the static electricity, and thus when the electrode slurry is dried, it is possible to prevent the binders from being concentrated on the surface of the electrode slurry while the solvent contained in the electrode slurry is volatilized.

Specifically, the electrode slurry may contain an ionic binder having a (+) electric charge, and in this case, a (−) electric charge may be induced on a back surface of an electrode current collector coated with the electrode slurry. Alternatively, the electrode slurry may contain an electrode slurry containing an ionic binder having a (−) electric charge, and in this case, a (+) electric charge may be induced on the back surface of the electrode current collector coated with the electrode slurry.

The type of the ionic binder is not particularly limited as long as the ionic binder has an electric charge, and examples of the ionic binder may include one or more polymers selected from the group consisting of hydroxypropyl cellulose, regenerated cellulose, PAA, PAN, PAM, SBR, acrylonitrile-butadiene rubber, acrylic rubber, butyl rubber, fluoro rubber, PVA, PEG, and alginate in consideration of a bonding force with the electrode active materials and the electrical properties inside the mixture layer. The polymers may include a carboxyl group (—COOH) or a sulfone group (—SOOOH), and apart of the polymers may have a (−) electric charge due to the form of a salt with an alkali metal ion such as $Na^+$ or $Li^+$.

As an example, the ionic binder contained in the electrode slurry may include carboxymethyl cellulose (Na-CMC) partially substituted with $Na^+$, and the electrostatic induction device may induce a (+) electric charge on the back surface of the electrode current collector of which the surface is coated with the electrode slurry.

Further, the ionic binder may be included in an amount of 0.5 to 10 parts by weight with respect to 100 parts by weight of a total amount of the electrode slurry and specifically may be included in an amount of 0.5 to 5 parts by weight or 1 to 4 parts by weight with respect to 100 parts by weight of the total amount of the electrode slurry.

In addition, the induction of the static electricity on the back surface of the electrode current collector may be performed by contact charging between the back surface of the electrode current collector and an electrostatic induction material or may be performed by triboelectric charging of a friction member.

Specifically, the electrostatic induction may be performed by bringing an electrostatic induction material such as ebonite, glass, nylon, wool, rayon, silk, paper, iron, rubber, copper, silver, gold, platinum, polystyrene, acrylic, celluloid, polyvinylchloride, polypropylene, polyethylene, silicone, TEFLON, or the like into contact with the back surface of the electrode current collector, or by preparing a separate friction member and bringing an electric charge generated by friction of the prepared friction member to be close to the back surface of the electrode current collector.

Meanwhile, the method of manufacturing an electrode according to the present invention may further include drying the electrode slurry applied on one surface of the electrode current collector after inducing the static electricity on the back surface of the electrode current collector.

Although the drying of the electrode slurry is performed under high temperature conditions so that the solvent contained in the electrode slurry is volatilized, ionic binders which are uniformly dispersed in the electrode slurry by the static electricity induced on the back surface of the electrode current collector are fixed to a lower part of the electrode slurry close to the electrode current collector, and thus it is possible to prevent the ionic binders from being concentrated on the surface of the electrode slurry by being moved to the surface of the electrode slurry.

In this case, the drying of the electrode slurry may be performed at a temperature required to remove the solvent contained in the electrode slurry, specifically, may be performed at a temperature of 50° C. to 200° C., and more specifically, may be performed at a temperature of 50° C. to 200° C., 80° C. to 200° C., 100° C. to 200° C., 80° C. to 150° C., or 110° C. to 180° C.

The method of manufacturing an electrode according to the present invention may be performed using the above-described electrode coating apparatus, and accordingly, an electrode slurry containing ionic binders having an electric charge is applied on the surface of the electrode current collector, and an electric charge opposite to the electric charge of the ionic binder is charged to the back surface of the electrode current collector coated with the electrode slurry to induce the static electricity, and thus when the electrode slurry is dried, it is possible to prevent the binders from being concentrated on the surface of the electrode slurry while the solvent contained in the electrode slurry is volatilized.

Mode for Implementation of the Invention

Hereinafter, the present invention will be described in more detail with reference to examples and comparative examples.

However, the examples and comparative examples described below are merely intended to illustrate the present invention, and the content of the present invention is not limited to the examples and comparative examples described below.

Examples 1 to 3 and Comparative Examples 1 to 3.
Preparation of Negative Electrode for Lithium Secondary Battery In order to manufacture a negative electrode for a lithium secondary battery, a thin copper plate was prepared. Separately, water was introduced into a homo mixer, particles containing natural graphite and silicon (Si) serving as a negative electrode active material, SBR serving as a binder, and CMC substituted with Na were weighed in a weight ratio of 80:10:1:2, and each separately added, and then mixed at 3,000 rpm for 60 minutes to prepare a negative electrode slurry.

The prepared thin copper plate was fixed to the transfer unit 11 of the electrode coating apparatus having the structure illustrated in FIG. 1, and the prepared negative electrode slurry was introduced into the coater 20. Then, the negative electrode slurry was applied on a surface of the thin copper plate serving as an electrode current collector by operating the electrode coating apparatus.

The electrode current collector coated with the negative electrode slurry was transferred to a drying unit to form a negative electrode mixture layer in which the negative electrode slurry was dried, and the negative electrode mixture layer was rolled to manufacture a negative electrode for a lithium secondary battery. In this case, a total thickness of the negative electrode mixture layer was 150 μm, and a total thickness of the manufactured negative electrode was 200 μm. Further, as illustrated in FIG. 3, the electrostatic inducer induced static electricity on a back surface of the thin copper plate of which the surface was coated with the negative electrode slurry by triboelectric charging, and a traveling speed of the transfer unit, whether the electrostatic inducer is operated before drying (i.e., the presence or absence of positive electric charge), and a drying temperature of the drying unit are as shown in Table 1 below.

TABLE 1

|  | Traveling speed of transfer unit | Electrostatic inducer operated | Drying temperature |
| --- | --- | --- | --- |
| Example 1 | 30 m/min | ○ | 60° C. |
| Example 2 | 90 m/min | ○ | 60° C. |
| Example 3 | 90 m/min | ○ | 90° C. |
| Comparative Example 1 | 30 m/min | X | 60° C. |
| Comparative Example 2 | 90 m/min | X | 60° C. |
| Comparative Example 3 | 90 m/min | X | 90° C. |

Experimental Example

In order to evaluate the performance of the electrode manufactured according to the present invention, the following experiments were performed.

Evaluation of Adhesive Force of Negative Electrode Mixture Layer

The negative electrodes manufactured in examples and comparative examples were cut so that the horizontal and vertical lengths were 25 mm and 70 mm, respectively, and a specimen was manufactured by pressurizing the negative electrodes at 70° C. and 4 MPa using a press. The prepared specimen was fixedly attached to a glass plate using double-sided tape, and in this case, the current collector was disposed to face the glass plate. A second mixture layer part of the specimen was separated at an angle of 90° at 25° C. at a speed of 100 mm/min using a tensile tester, and in this case, a separation force was measured in real time, and an average value of the measured separation forces was defined as an adhesive force of the negative electrode mixture layer. Results of the measurement are shown in Table 2 below.

Evaluation of Electrode Resistance

Sheet resistance of the electrode was measured using a 4-point probe method for the negative electrodes manufactured in examples and comparative examples, and results of the measurement are shown in Table 2 below.

Evaluation of Electrode Lifetime

N-methylpyrrolidone was introduced into a homo mixer, 96 parts by weight of $LiNi_{0.6}Co_{0.2}Mn_{0.2}O_2$ serving as a positive electrode active material with respect to 100 parts by weight of a solid content of a positive electrode slurry, 2 parts by weight of carbon black serving as a conductive material, and 2 parts by weight of PVdF serving as a binder were weighed and added, and then mixed at 2,000 rpm for 30 minutes to prepare a positive electrode slurry.

The prepared positive electrode slurry was applied on one surface of an aluminum current collector, dried at 100° C., and then rolled to manufacture a positive electrode. In this case, a total thickness of the positive electrode mixture layer was 160 μm, and a total thickness of the manufactured positive electrode was about 200 μm.

The manufactured positive electrode and the negative electrodes manufactured in examples and comparative examples were stacked with a separator (thickness: about 16 μm) made of a porous polyethylene (PE) film interposed therebetween, and E2DVC serving as an electrolyte was added to manufacture a full-cell type cell.

Here, the "E2DVC" is a type of carbonate-based electrolyte and is a solution obtained by mixing lithium hexafluorophosphate ($LiPF_6$, 1.0 M) and vinyl carbonate (VC, 2 wt %) in a mixture of ethylene carbonate (EC): dimethyl carbonate (DMC): diethyl carbonate (DEC)=1:1:1 (volume ratio).

A capacity retention rate [%] was measured while each manufactured lithium secondary battery was charged and discharged 200 times (n=200) under the conditions of a charging termination voltage 4.25 V, a discharging termination voltage of 2.5 V, and 0.33 C/0.33 C at 25° C. Results of the measurement are shown in Table 2 below.

TABLE 2

|  | Adhesive force [N/m] of negative electrode mixture layer | Electrode resistance [Ω/sq.] | Capacity retention rate [%] when charging and discharging 200 times (n = 200) |
| --- | --- | --- | --- |
| Example 1 | 41 | 2.1 ± 0.05 | 94.4 |
| Example 2 | 38 | 2.0 ± 0.05 | 96.3 |
| Example 3 | 37 | 2.2 ± 0.05 | 95.8 |
| Comparative Example 1 | 26 | 3.3 ± 0.05 | 87.8 |
| Comparative Example 2 | 25 | 3.2 ± 0.05 | 89.5 |
| Comparative Example 3 | 25 | 3.3 ± 0.05 | 89.9 |

It can be seen that the electrode manufactured according to the present invention has an excellent adhesive force between the electrode mixture layer and the electrode current collector and has excellent electrical performance.

Specifically, it was found that the negative electrode for a lithium secondary battery of examples in which the electrode slurry was applied on the surface of the electrode current collector and the static electricity was induced on the back surface of the electrode current collector coated with the electrode slurry had a high adhesive force exceeding 35 N/m between the negative electrode mixture layer and the current collector, electrode resistance of 2.2 Ω/sq. or lower, and a capacity retention rate exceeding 95% after 200 charging and discharging.

On the other hand, it was confirmed that the negative electrode for a lithium secondary battery of comparative examples in which the static electricity was not induced on the back surface of the electrode current collector coated with the electrode slurry had a weak adhesive force between the negative electrode mixture layer and the current collector and had low electrical performance.

It was confirmed from the above results that, in the electrode coating apparatus and the method of manufacturing an electrode using the same according to the present invention, by inducing static electricity on a back side of an electrode current collector of which a surface is coated with an electrode slurry so that the electrode slurry has an electric charge opposite to an electric charge of an ionic binder contained in the electrode slurry as a binder, even when solvent volatilization occurs during a drying process of the electrode slurry, it is possible to prevent binders from being moved to a surface of the electrode slurry, and thus it is possible to improve an adhesive force between an electrode mixture layer formed by drying the electrode slurry and the electrode current collector.

While exemplary embodiments of the present invention and their advantages have been described above in detail, it should be understood by those skilled in the art that various changes, substitutions and alterations may be made herein without departing from the scope of the invention as defined by the following claims.

Therefore, the technical scope of the present invention should not be limited to the content described in the detailed description of the specification, but should be defined by the appended claims.

REFERENCE NUMERALS

1: ELECTRODE COATING APPARATUS
11 and 12: TRANSFER UNIT
20: COATER
30: ELECTROSTATIC INDUCER
31: CHARGING REGION
32: NON-CHARGING REGION
40: DRYING UNIT
50: ROLLING UNIT
310: MAIN BODY CASE
320: MOTOR UNIT
321: POWER TRANSMISSION SHAFT
322: MOTOR
323: EXTERNAL POWER SOURCE
330: STATIC ELECTRICITY GENERATOR
331: ROTARY FRICTION MEMBER
332: FIXED FRICTION MEMBER
333: ELECTROSTATIC INDUCTION MEMBER
334: ELECTROSTATIC INDUCTION WIRE
340: STATIC ELECTRICITY PLATE
350: CONTROL UNIT
F: ELECTRODE CURRENT COLLECTOR
S: ELECTRODE SLURRY
Fc: COATING PART OF ELECTRODE CURRENT COLLECTOR WHICH IS COATED WITH ELECTRODE SLURRY
Fn: UNCOATING PART OF ELECTRODE CURRENT COLLECTOR WHICH IS NOT COATED WITH ELECTRODE SLURRY

The invention claimed is:

1. An electrode coating apparatus comprising:
a transfer unit configured to move an electrode current collector in a roll-to-roll manner;
a coater configured to discharge an electrode slurry on a first surface of the electrode current collector being moved by the transfer unit; and
an electrostatic inducer configured to induce static electricity on a second surface of the electrode current collector opposite the first surface coated with the electrode slurry, including:
a motor;
a power transmission shaft coupled to the motor, the power transmission shaft having a gear on an outer circumferential surface thereof;
a static electricity generator including:
a circular rotary friction member having a gear formed on an outer circumferential surface thereof, the circular rotary friction member being configured to be rotated by rotation of the power transmission shaft;
a fixed friction member located at one side of an outer circumferential surface of the rotary friction member to be in contact with the outer circumferential surface of the rotary friction member;
an arc-shaped electrostatic induction member spaced a predetermined distance from the rotary friction member, the arc-shaped electrostatic induction member being located at a position symmetrical to that of the fixed friction member with respect to the rotary friction member; and
an electrostatic induction wire located at one side of the electrostatic induction member; and
a static electricity plate connected to the electrostatic induction member by the electrostatic induction wire, the static electricity plate being configured to have an electric charge on a surface thereof, and the static electricity plate facing the second surface of the electrode current collector, and
wherein the static electricity plate has a distance of about 1 cm to 30 cm from the second surface of the electrode current collector.

2. The electrode coating apparatus of claim 1, wherein the gear of the circular rotary friction member is located above or below the outer circumferential surface of the rotary friction member; and
wherein the fixed friction member is in surface contact with the outer circumferential surface of the rotary friction member.

3. The electrode coating apparatus of claim 1, wherein the electrode slurry contains an ionic binder; and
wherein the electrostatic inducer is configured to induce an electric charge opposite to an ionic charge of the ionic binder of the electrode slurry applied on the first surface of the electrode current collector on the second surface of the electrode current collector.

4. The electrode coating apparatus of claim 3, wherein the ionic binder includes at least one polymer selected from carboxymethyl cellulose (CMC), hydroxypropyl cellulose, regenerated cellulose, polyacrylic acid (PAA), polyacrylonitrile, polyacrylamide, styrene-butadiene rubber (SBR), acrylonitrile-butadiene rubber, acrylic rubber, butyl rubber, fluoro rubber, polyvinyl alcohol, polyethylene glycol, or alginate.

5. The electrode coating apparatus of claim 1, wherein the transfer unit is configured to be operated at a speed of 20 to 100 m/min.

* * * * *